US008600448B2

(12) United States Patent
Lee et al.

(10) Patent No.: US 8,600,448 B2
(45) Date of Patent: Dec. 3, 2013

(54) HOUSING STRUCTURE FOR A SLIDE TYPE MOBILE COMMUNICATION TERMINAL

(75) Inventors: Yong-Hee Lee, Seoul (KR); Ki-Hyun Kim, Seoul (KR); Bong-Hyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 12/797,569

(22) Filed: Jun. 9, 2010

(65) Prior Publication Data

US 2011/0077053 A1  Mar. 31, 2011

(30) Foreign Application Priority Data

Sep. 25, 2009 (KR) .................. 10-2009-0091283

(51) Int. Cl.
*H04B 1/00* (2006.01)
*H04M 1/00* (2006.01)
*G06F 3/02* (2006.01)

(52) U.S. Cl.
USPC .................. 455/566; 455/575.4; 345/169

(58) Field of Classification Search
USPC ................. 455/566, 575.4; 345/169
See application file for complete search history.

(56) References Cited

U.S. PATENT DOCUMENTS

| | | | | |
|---|---|---|---|---|
| 7,580,726 B2 * | 8/2009 | Maatta et al. | .............. | 455/550.1 |
| 7,627,337 B2 * | 12/2009 | Maatta et al. | .............. | 455/550.1 |
| 2007/0037618 A1 * | 2/2007 | Lee | ............... | 455/575.4 |
| 2008/0132303 A1 * | 6/2008 | Naukkarinen et al. | ..... | 455/575.4 |
| 2009/0181733 A1 | 7/2009 | Demuycnk | | |
| 2009/0212675 A1 | 8/2009 | Zhang et al. | | |
| 2009/0312061 A1 * | 12/2009 | Demuynck | ................... | 455/566 |
| 2010/0004038 A1 * | 1/2010 | Kwak et al. | ................ | 455/575.4 |
| 2010/0279750 A1 * | 11/2010 | Laaksonen | ................ | 455/575.4 |

FOREIGN PATENT DOCUMENTS

| | | | | |
|---|---|---|---|---|
| CN | 101522005 | | 9/2009 | |
| WO | WO 2009/080083 A1 * | | 8/2009 | ............. H04M 1/02 |

OTHER PUBLICATIONS

The State Intellectual Property Office of the People's Republic of China Application Serial Number 201010264006.1, Office Action dated Mar. 4, 2013, 4 pages.

* cited by examiner

*Primary Examiner* — Jinsong Hu
*Assistant Examiner* — William Nealon
(74) *Attorney, Agent, or Firm* — Lee, Hong, Degerman, Kang & Waimey

(57) ABSTRACT

A mobile terminal includes a front body, a rear body, and a slide module connecting the front body to the rear body such that the front body is slidable with respect to the rear body, the slide module including a first slide member fixed to a front surface of the rear body and having a rail unit at both sides of the rear body, the rail unit having a specific length corresponding to a slide stroke of the front body; and a second slide member fixed to a rear surface of the front body and having a moving guide constrained to the rail unit at both sides of the rear body and slidably moved along the rail unit, in which the moving guide protrudes toward the rear body in order to receive the rail unit and cover the rail unit.

21 Claims, 13 Drawing Sheets

HOUSING STRUCTURE FOR A SLIDE TYPE MOBILE COMMUNICATION TERMINAL

CROSS REFERENCE TO RELATED APPLICATIONS

The present application claims the benefit of earlier filing date and right of priority to Korean Application No. 10-2009-0091283 filed on Sep. 25, 2009, the entire contents of which are hereby incorporated by reference in their entirety.

BACKGROUND

1. Field of the Invention

The present invention relates to a mobile communication terminal, more particularly, a slide type mobile communication terminal.

2. Description of the Related Art

A mobile terminal is a device that can be carried around and has one or more functions such as voice and video call communication, inputting and outputting information, and storing data.

As such functions become more diversified, the mobile terminal can support more complicated functions such as capturing images or video, reproducing music or video files, playing games, and receiving broadcast signals. By comprehensively and collectively implementing such functions, the mobile terminal may be embodied in the form of a multimedia player or device.

In order to implement various functions of such multimedia players or devices, the mobile terminal requires sufficient hardware or software support, for which numerous attempts are being made and implemented. For example, a user interface allowing users to easily and conveniently search for and select one or more functions is provided.

As mobile terminals are considered to be personal belongings, form factors of mobile terminals are diversified to facilitate selection according to personalities. Conventional forms of mobile terminals include a bar type mobile terminal including input and output units and a display on a single body, a folder type mobile terminal or a swing type mobile terminal having one body rotated to be open or closed with respect to another body, and a slide type mobile terminal having one body slidably moved to be open or closed with respect to another body.

The slide type mobile terminal is largely preferred due to its advantages that it is simple to open and its display is always directly exposed to facilitate recognition. The slide type mobile terminal includes a slide module and means for connecting a front body to a rear body such that it is slidably moved. The slide module needs to be formed such that degradation of an outer appearance is minimized by a portion exposed when the mobile terminal is slidably open while maintaining a mechanical firmness during the repeated sliding operation.

SUMMARY

Accordingly, one object of the present invention is to address the above-noted and other problems.

Another object of the present invention is to provide a slide type mobile terminal having an improved outer appearance by exposing components of a slide module in a minimum extent when the mobile terminal is opened by a sliding motion.

Still another object of the present invention is to provide a slide type mobile terminal securing a mechanical firmness by reducing unused space caused by a slide module itself.

To achieve these and other advantages and in accordance with the purpose of the present invention, as embodied and broadly described herein, the present invention provides in one aspect a mobile terminal that includes a front body, a rear body, and a slide module connecting the front body to the rear body such that the front body is slidable with respect to the rear body, the slide module including a first slide member fixed to a front surface of the rear body and having a rail unit at both sides of the rear body, the rail unit having a specific length corresponding to a slide stroke of the front body; and a second slide member fixed to a rear surface of the front body and having a moving guide constrained to the rail unit at both sides of the rear body and slidably moved along the rail unit, in which the moving guide protrudes toward the rear body in order to receive the rail unit and cover the rail unit.

The present invention provides in another aspect a mobile terminal including a front body; a rear body; a display module provided in the front body; and a slide module connecting the front body to the rear body such that the front body is slidable with respect to the rear body, in which the slide module includes a first slide member fixed to a front surface of the rear body and having a rail unit at both sides of the rear body, the rail unit having a specific length corresponding to a slide stroke of the front body; and a second slide member fixed to a rear surface of the front body and having a moving guide constrained to the rail unit at both sides of the rear body and displaced by a sliding motion along the rail unit, in which the moving guide is positioned at a centered location of the second slide member such that the moving guide is not exposed when the first and second slide members partially overlap, and the moving guide protrudes toward the rear body in order to receive the rail unit and cover the rail unit so a thickness of the front body can be reduced and a surface area of the display module can be increased.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION

The mobile terminal according to exemplary embodiments of the present disclosure will now be described with reference to the accompanying drawings. In the following description, usage of suffixes such as 'module', 'part' or 'unit' used for referring to elements is given merely to facilitate explanation of the present disclosure, without having any significant meaning by itself.

Figure 1:
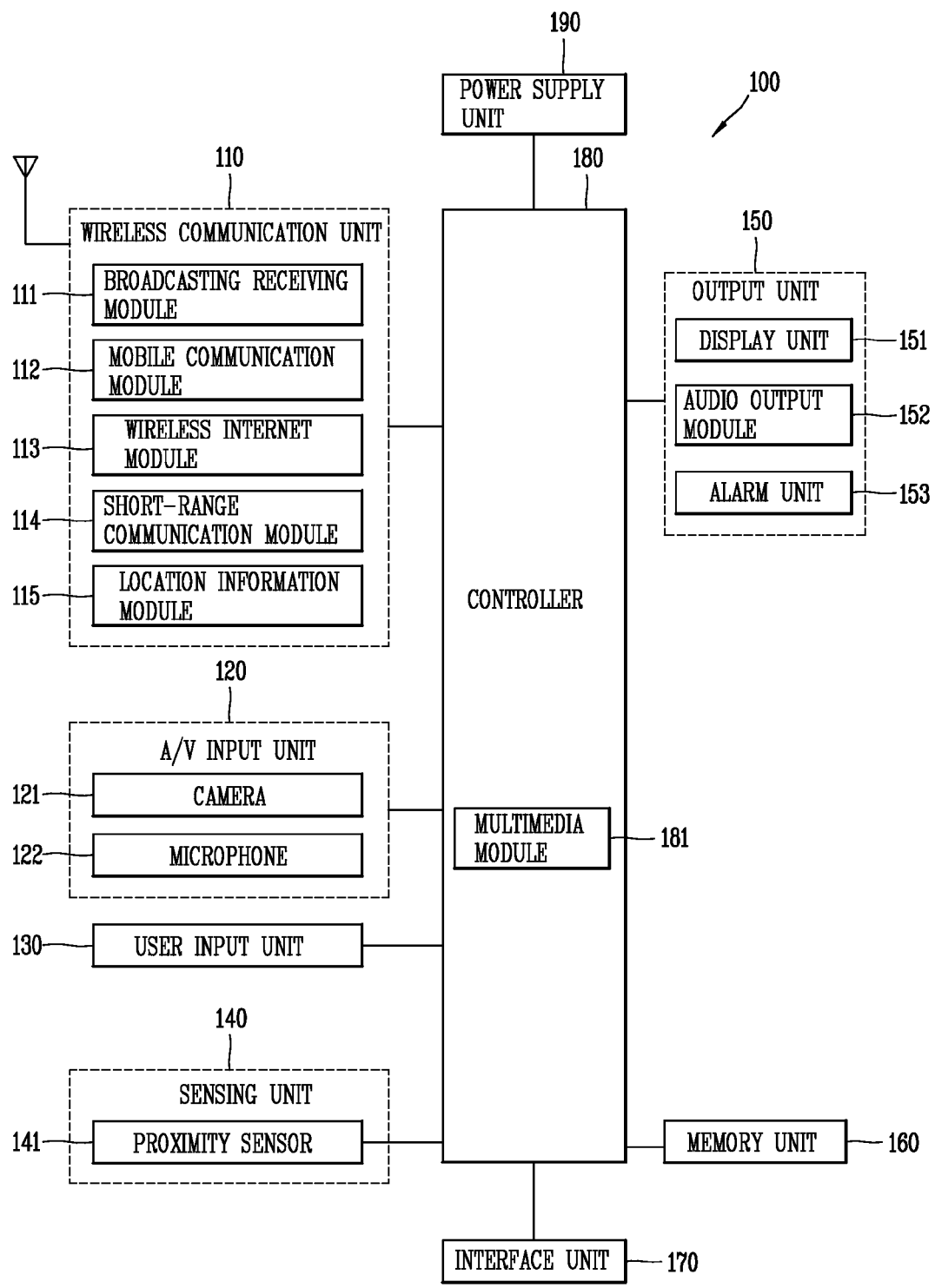
FIG. 1 is a schematic block diagram of a mobile terminal according to the present invention.

FIG. 1 is a block diagram of a mobile terminal according to the present invention. The mobile terminal 100 may include a wireless communication unit 110, an A/V (Audio/Video) input unit 120, a user input unit 130, a sensing unit 140, an output unit 150, a memory unit 160, an interface unit 170, a controller 180, and a power supply unit 190. The components as shown in FIG. 1 are not required since greater or fewer components may alternatively be implemented.

The wireless communication unit 110 may include one or more components allowing radio communication between the mobile terminal 100 and a wireless communication system or a network in which the mobile terminal is located. For example, the wireless communication unit 110 may include a broadcast receiving module 111, a mobile communication module 112, a wireless Internet module 113, a short-range communication module 114, and a location information module 115.

The broadcast receiving module 111 receives either broadcast signals or broadcast associated information from an external broadcast management server via a broadcast channel. The broadcast channel may include a satellite channel and a terrestrial channel. The broadcast management server may refer to a server that generates and transmits a broadcast signal and broadcast associated information or a server that receives and transmits a previously generated broadcast signal or broadcast associated information to a terminal. The broadcast signal may include not only a TV broadcast signal, a radio broadcast signal and a data broadcast signal, but also a broadcast signal obtained by coupling a data broadcast signal to the TV or radio broadcast signal. The broadcast associated information may be information related to a broadcast channel, a broadcast program or a broadcast service provider.

The broadcast associated information may be provided via a mobile communication network and may be received by the mobile communication module 112.

The broadcast associated information may exist in various forms. For example, the broadcast associated information may exist in the form of an electronic program guide (EPG) of digital multimedia broadcasting (DMB), electronic service guide (ESG) of digital video broadcast-handheld (DVB-H).

The broadcast receiving module 111 may receive digital broadcast signals by using digital broadcast systems such as multimedia broadcasting-terrestrial (DMB-T), digital multimedia broadcasting-satellite (DMB-S), media forward link only (MediaFLO®), digital video broadcast-handheld (DVB-H), and integrated services digital broadcast-terrestrial (ISDB-T). The broadcast receiving module 111 may be configured to be suitable for any other broadcast systems as well as the above-described digital broadcast systems. Broadcast signals and broadcast-associated information received via the broadcast receiving module 111 may be stored in the memory unit 160.

The mobile communication module 112 transmits and receives radio signals to and from at least one of a base station, an external terminal and a server. Such radio signals may include a voice call signal, a video call signal or various types of data according to text/multimedia message transmission and reception.

The wireless Internet module 113 refers to a module for wireless Internet access. This module may be internally or externally coupled to the mobile terminal 100. The wireless Internet technique may include a WLAN (Wireless LAN) (Wi-Fi), Wibro (Wireless broadband), Wimax (World Interoperability for Microwave Access), and HSDPA (High Speed Downlink Packet Access).

The short-range communication module 114 refers to a module for short-range communication. For example, Bluetooth®, radio frequency identification (RFID), infrared data association (IrDA), ultra-wideband (UWB), and ZigBee® may be used as the short range communication technologies.

The location information module 115 is a module for checking or acquiring a location or position of the mobile terminal 100. A typical example of the location information module is a GPS (Global Positioning System).

According to the current technology, the location information module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite has been provided. In addition, the location information module 115 can calculate speed information by continuously calculating the current location in real time.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151 or other visual output device.

The image frames processed by the camera 121 may be stored in the memory unit 160 or transmitted via the wireless communication unit 110. Two or more cameras 121 may be provided according to the configuration of the mobile terminal 100.

The microphone 122 may receive sounds (e.g., audible data) in a phone call mode, a recording mode, or a voice recognition mode and can process the received sounds into audio data. The processed audio (e.g., voice) data may be converted for output into a format transmittable to a mobile communication base station via the mobile communication module 112 in the phone call mode. The microphone 122 may implement various types of noise canceling or suppression algorithms to cancel or suppress noise or interference generated when receiving and transmitting audio signals.

The user input unit 130 or other user input device may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, or capacitance due to being contacted), a jog wheel, or a jog switch. In particular, when the touch pad is overlaid on the display unit 151 in a layered manner, it may form a touch screen.

The sensing unit 140 detects a current status or a state of the mobile terminal 100 such as an opened or closed state, a location of the mobile terminal 100, the presence or absence of user contact with the mobile terminal 100 (i.e., touch inputs), the orientation of the mobile terminal 100, or an acceleration or deceleration movement and direction of the mobile terminal 100, and generates commands or signals for controlling the operation of the mobile terminal 100.

For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

Meanwhile, the sensing unit 140 may include a proximity sensor 141. The proximity sensor 141 may be disposed within or near the touch screen.

The proximity sensor 141 is a sensor for detecting the presence or absence of an object relative to a certain detection surface or an object that exists nearby by using the force of electromagnetism or infrared rays without a physical contact. Without the proximity sensor 141, if the touch screen is an electrostatic type, the approach of a pointer (e.g., stylus) can be detected based on a change in a field according to the approach of the pointer.

The interface unit 170 serves as an interface by which at least one external device may be connected with the mobile terminal 100. For example, the external devices may include wired or wireless headset ports, an external power supply port, wired or wireless data ports, memory card ports, ports for connecting a device having an identification module, audio input/output (I/O) ports, video I/O ports, or earphone ports.

The identification module may be a chip that stores various information for authenticating user's authority for using the mobile terminal 100 and may include a user identity module (UIM), a subscriber identity module (SIM), and a universal subscriber identity module (USIM). In addition, the device having the identification module (referred to as the 'identifying device', hereinafter) may take the form of a smart card.

The identifying device may be connected with the mobile terminal 100 via a port or other connection means. The interface unit 170 may be used to receive inputs (e.g., data, information, power) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied to the mobile terminal 100 or may serve as a conduit to allow various command signals input from the cradle to be transferred to the mobile terminal 100. Various command signals or power input from the cradle may be operated as a signal for recognizing that the mobile terminal 100 is accurately mounted on the cradle.

The output unit 150 is configured to provide outputs in a visual, audible, and/or tactile manner (e.g., audio signal, video signal, alarm signal, vibration signal). The output unit 150 may include the display unit 151, an audio output module 152, and an alarm unit 153.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication, such as text messaging and multimedia file downloading. When the mobile terminal 100 is in a video call mode or image capturing mode, the display unit 151 may display a captured image and/or received image, a UI or GUI that shows videos or images and related functions.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display.

Some displays may be configured to be transparent to allow viewing of the exterior, and may be called transparent displays. A typical transparent display may be, for example, a TOLED (Transparent Organic Light Emitting Diode) display.

The mobile terminal 100 may include two or more display units or other display means according to its particular desired embodiment. For example, the mobile terminal 100 may include both an external display unit 151 and an internal display unit (not shown). The touch screen may be configured to detect even a touch input pressure as well as a touch input position and a touch input area.

The audio output module 152 may convert and output as sound audio data received from the wireless communication unit 110 or stored in the memory unit 160 in a call signal reception mode, a call mode, a record mode, a voice recognition mode, and a broadcast reception mode. Also, the audio output module 152 may provide audible outputs related to a particular function performed by the mobile terminal 100 (e.g., a call signal reception sound, a message reception sound.). The audio output module 152 may include a speaker, a buzzer, or other sound generating device.

The alarm unit 153 or other type of user notification means may provide outputs to inform about the occurrence of an event of the mobile terminal 100. Typical events may include call reception, message reception, key signal inputs, and a touch input.

In addition to audio or video outputs, the alarm unit 153 may provide outputs in a different manner to inform about the occurrence of an event. For example, the alarm unit 153 may provide an output in the form of vibrations or other tactile or sensible outputs.

When a call, a message, or some other incoming communication is received, the alarm unit 153 may provide tactile outputs (i.e., vibrations) to inform the user. By providing such tactile outputs, the user can recognize the occurrence of various events even if his mobile terminal 100 is in the user's pocket. Outputs informing about the occurrence of an event may be also provided via the display unit 151 or the audio output module 152.

The memory unit 160 may store software programs used for the processing and controlling operations performed by the controller 180, or may temporarily store data (e.g., a phonebook, messages, still images, video) that have or are to be output. In addition, the memory unit 160 may store data regarding various patterns of vibrations and sounds output when a touch is applied to the touch screen.

The memory unit 160 may include at least one type of storage medium including a Flash memory, a hard disk, a multimedia card, a card-type memory (e.g., SD or DX memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. Also, the mobile terminal 100 may cooperate with a network storage device that performs the storage function of the memory unit 160 via a network connection.

The controller 180 typically controls the general operations of the mobile terminal 100. For example, the controller 180 performs controlling and processing associated with voice calls, data communications, and video calls. The controller 180 may perform pattern recognition processing to recognize a handwriting input or a picture drawing input performed on the touch screen as characters or images.

In addition, the controller 180 may include a multimedia module 181 for reproducing or playing back multimedia data. The multimedia module 181 may be configured within the controller 180 or may be configured to be separate from the controller 180.

The power supply unit 190 receives external power via a power cable connection or internal power via a battery of the mobile terminal. The power supply unit 190 supplies appropriate power required for operating respective elements and components under the control of the controller 180.

Figure 2:
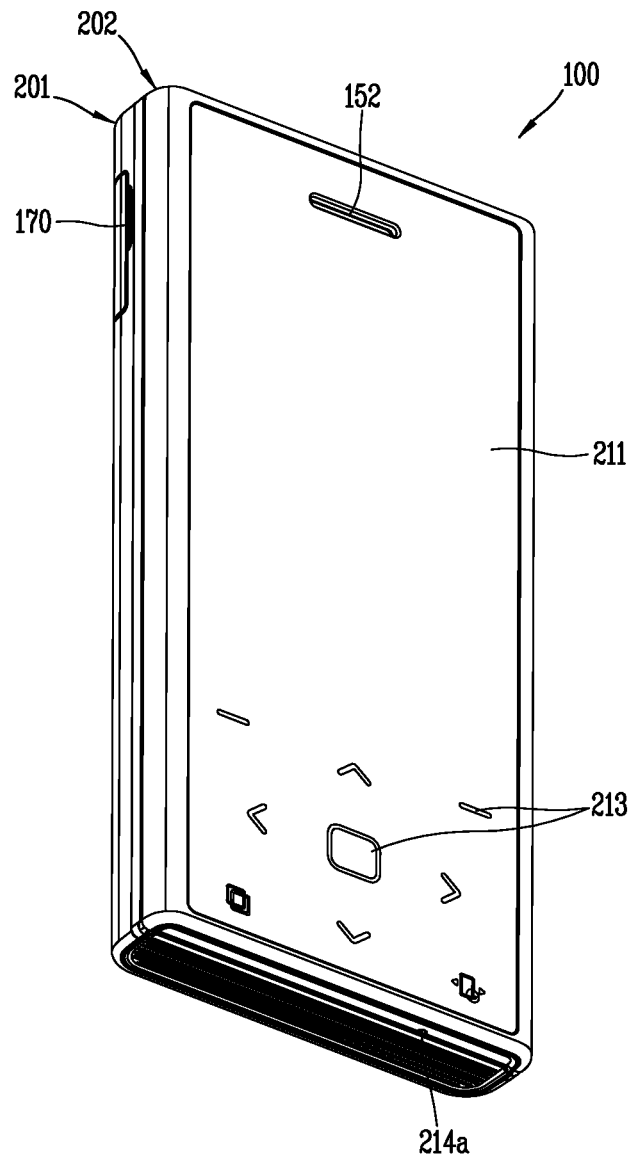
FIG. 2 is a front perspective view showing a closed configuration of the mobile terminal according to the present invention.

FIG. 2 is a front perspective view showing a closed configuration of the mobile terminal 100. The mobile terminal 100 includes a front body 202 coupled to a rear body 201 configured to be movable relative to each other.

The front body 202 is disposed to overlap with the rear body 201. A state in which a particular portion of the rear body 201 is exposed, as shown in FIG. 3 may be called an open configuration, and a state in which the particular portion of the rear body is covered by the front body 202 as shown in FIG. 2, may be called a closed configuration.

Figure 3:
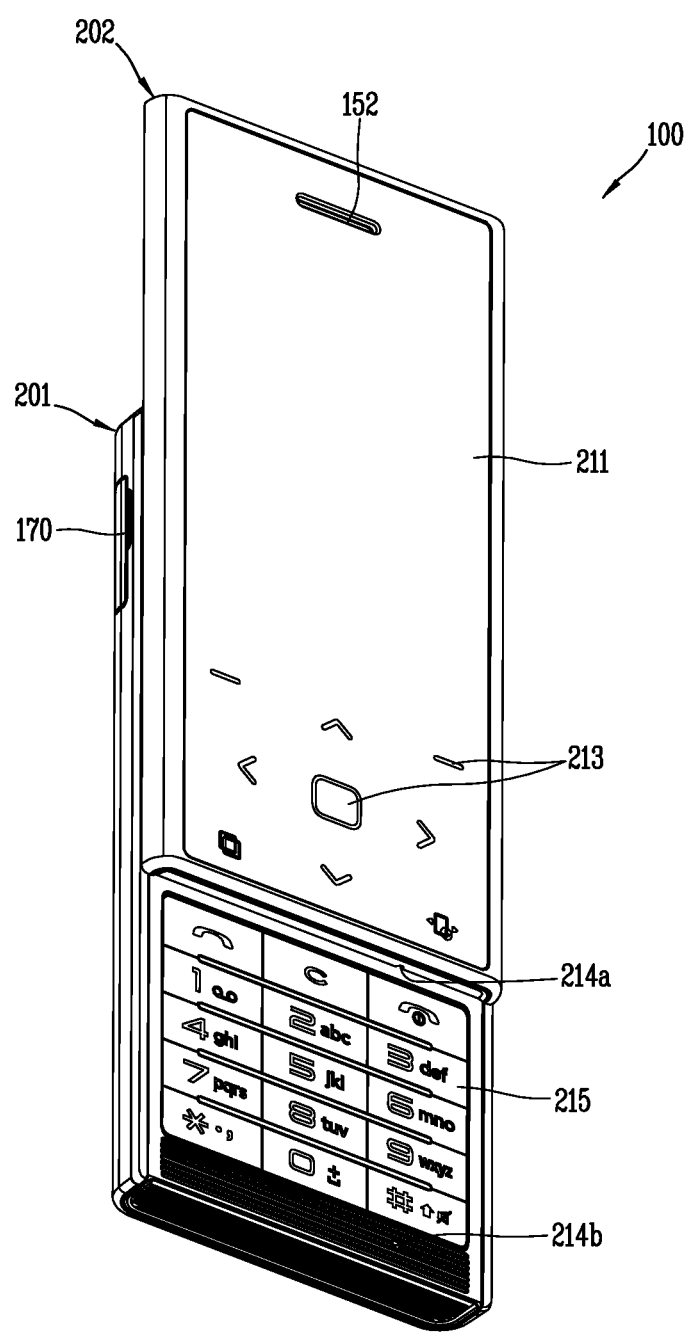
FIG. 3 is a front perspective view showing an open configuration of the mobile terminal of FIG. 2.

FIG. 3 is a front perspective view showing an open configuration of the mobile terminal 100 of FIG. 2. A keypad 215 for inputting characters or numbers is installed at a lower end portion of a front surface of the rear body 201. When the front body 202 is open, the keypad 215 is exposed, and when the front body 202 is closed, the keypad 215 is covered by the front body 202 so as to be unseen.

Figure 4:
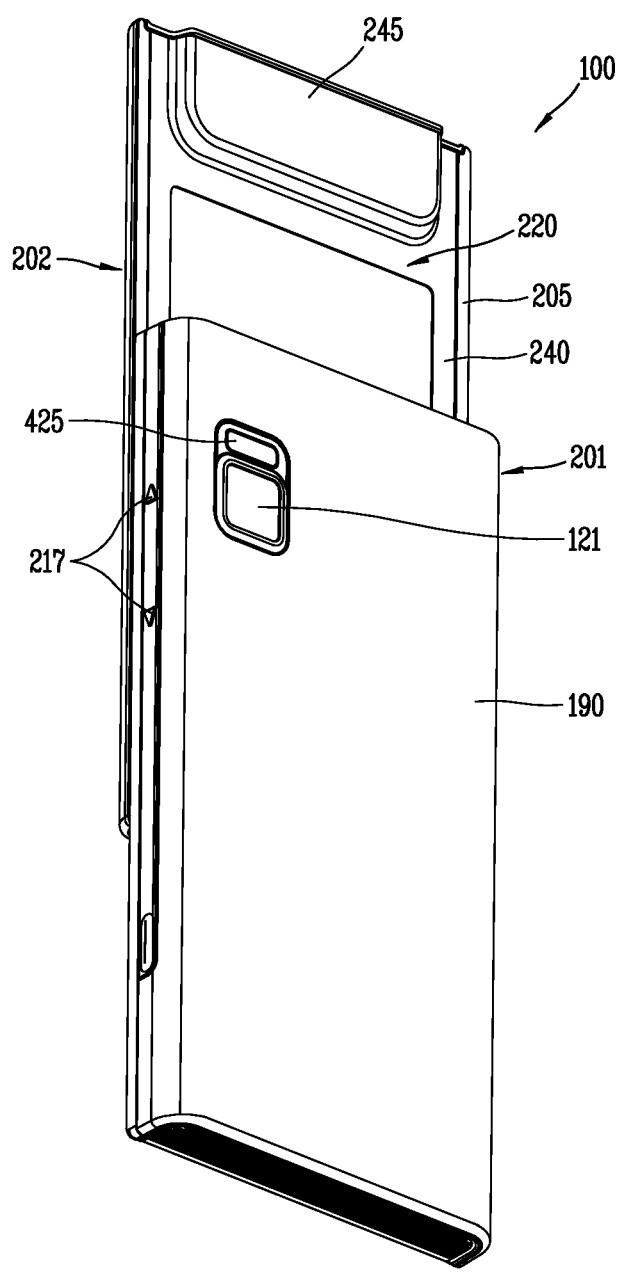
FIG. 4 is a rear perspective view of the mobile terminal of FIG. 3.

FIG. 4 is a rear perspective view of the mobile terminal 100 of FIG. 3. A power supply unit 190 is mounted on the rear surface of the rear body 201 to supply power to the mobile terminal 100. The power supply unit 190 may be formed to have a package form including a cell and a cover are integrally configured, or may be formed such that the cover is separated from the cell.

With regard to FIG. 2, an interface unit 170 is formed at the side of the rear body 201. The interface unit 170 may be used as a communication link or path through which the mobile terminal 100 can exchange data with an external device.

For example, the interface unit 170 may be implemented in the form of a connection port for connecting an earphone to the mobile terminal 100 via a wireline or wireless means, a port for short-range communications (e.g., an Infrared Data Association (IrDA) port, a Bluetooth™ port, or a wireless LAN port), or power supply ports for providing power to the mobile terminal. Also, the interface unit 170 may be a card socket for accommodating a SIM (Subscriber Identification Module) card or a UIM (User Identity Module) card, or an external card such as a memory card for storing information.

A window 211 with a particular region formed to be light-transmissive to allow the internal display module (270 in FIG. 12) to be seen is attached to the front surface of the front body 202, and a key manipulation unit 213 is installed at a lower side of the window 211. An audio output module 152 for outputting voice is formed at an upper portion of the window 211.

The window 211 may be formed to cover the entire surface of the front surface of the front body 202. In this case, the internal display module 270 and the key manipulation unit 213 may have a touch sensing unit to allow manipulation by touch.

The key manipulation unit 213 may be implemented in the conventional push-button form. In FIGS. 2 and 3, the key manipulation unit 213 operates in a tactile manner, and only a mark allowing for recognition of the key manipulation unit 213 is seen from the front surface of the front body 201.

With regard to FIG. 4, a side key 217 may be installed at the side of the rear body 201. The side key 217 may be generally called a manipulating portion along with the keypad 215 (FIG. 3) and the key manipulation unit 213 (FIG. 3), and they can employ any method so long as they can be manipulated in a tactile manner by the user.

For example, the manipulation portion may be implemented as a dome switch, a touch screen, a touch pad that can receive a command or information according to a user's push or touch manipulation. The manipulation portion may also be implemented in the form of a wheel rotating keys, a jog switch, and a joystick.

The key pad 215 or the key manipulation unit 213 may be used for inputting or entering information such as numbers, characters, or symbols, or menus such as start or end. The side key 217 may be used as a hot key for performing a particular function such as activating the image input unit 218 in addition to a scroll function.

With regard to FIG. 3, a sound hole 214a is formed at the side of the lower end of the front body 202 to guide sound. The sound hole 214a transfers a transmission sound to a microphone hole 214b formed in the interior of the front surface of the rear body 201 even when the front body 202 is closed. The sound hole 214a formed at the side may help simply configure the front surface of the front body 202, and allow for call communication whether or not the front body 202 is open or closed.

As shown in FIG. 4, an image input unit 218 is provided on the rear surface of the rear body 201 to allow for capturing of photo image or video. The image input unit 218 may be formed as a camera 121 and may include a flash 425 for adjusting the ambient brightness or a mirror (not shown) allowing the user to easily see the location of a subject when the subject is located at the user side.

The image input unit 218 may be disposed on the front surface of the front body 202. In this case, the image input unit 218 disposed on the front surface of the front body 202 may be disposed at an inner side of the window 211.

The front body 202 includes a front case 205 forming a front external appearance or a side external appearance. A slide module 220 is installed on the rear surface of the front case 205 to allow the front body 202 to be slidably moved with respect to the rear body 201. In particular, both sides of the slide module 220 exposed in the open configuration do not have such a shape as a rail, and thus, the rear surface of the front body 202 has a sleek, neat external appearance.

Figure 5:
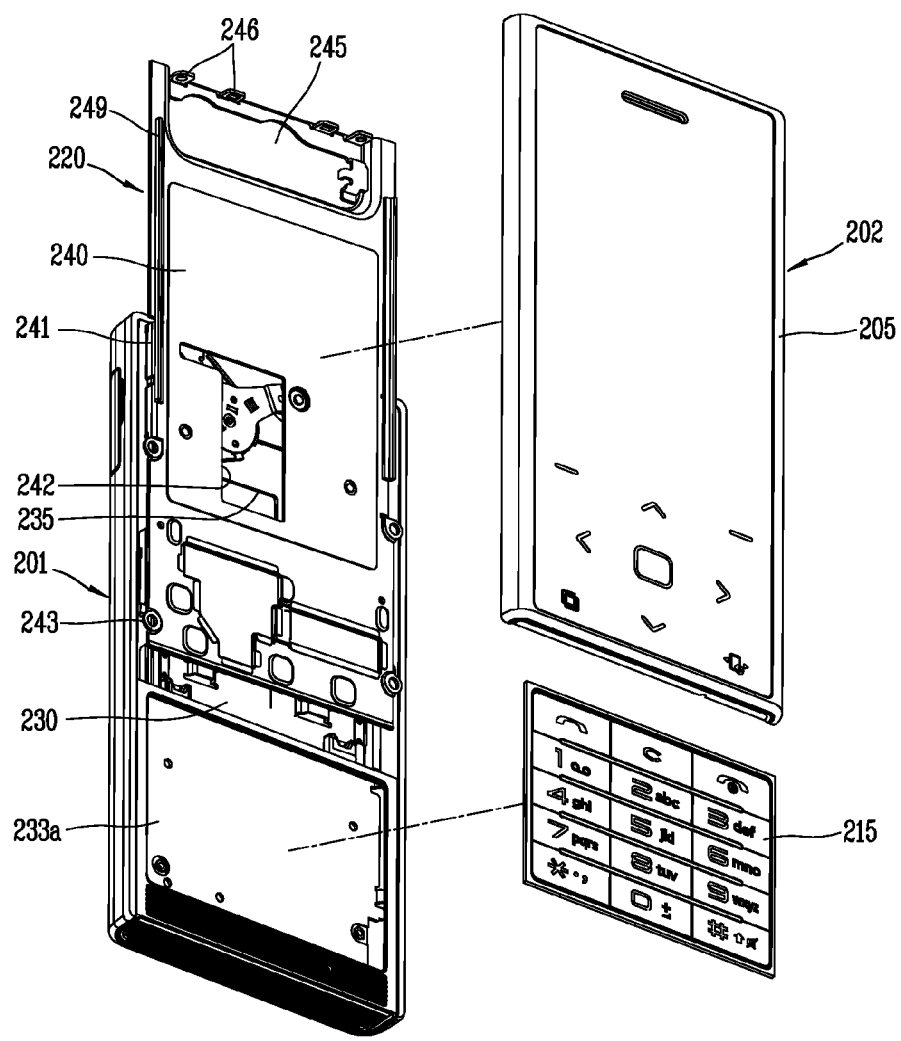
FIG. 5 is a perspective view showing a front body and a keypad separated from a slide module of a mobile terminal according to the present invention.

FIG. 5 is a perspective view showing a front body and a keypad separated from a slide module. The front body 202 is fixed to the slide module 220 by a fastening means, such as a screw.

The slide module 220 may be a plate formed of a metallic material having a complicated shape to have a rigid structure while allowing for disposition of internal components overall. The slide module 220 includes a first slide member 230 and a second slide member 240 which are coupled to be slidably moved relative to each other. The first slide member 230 is fixed to the rear body 201, and the second slide member 240 is fixed to the front body 202.

The second slide member 240 has an area covering the entire rear surface of the front body 202. The shape of the second slide member 240 also serves as a rear case of the front body 202, and advantageously facilitates assembly and handling while using small components.

Figure 6:
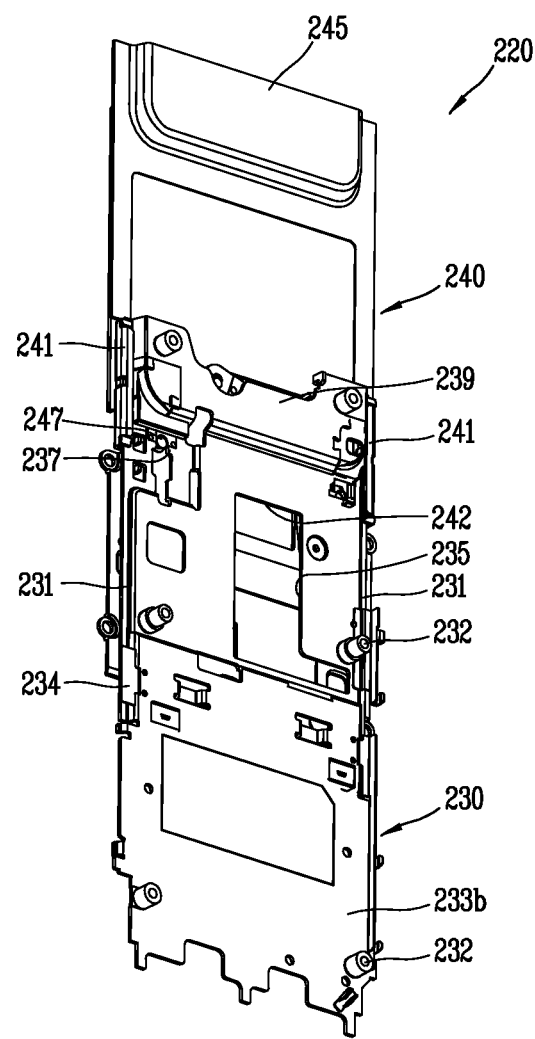
FIG. 6 is a rear perspective view of the slide module of FIG. 5.

FIG. 6 is a rear perspective view of the slide module of FIG. 5. The first slide member 230 includes a pair of rail units 231 at both ends. The second slide member 240 includes a moving guide 241 constrained in the rail units 231 so as to be slidably moved along the rail units 231. The rail units 231 allow the moving guide 241 of the second slide member 240 to be slidably moved by a pre-set slide stroke (S) (See FIG. 11B) while being constrained in the rail units 231.

Figure 7:
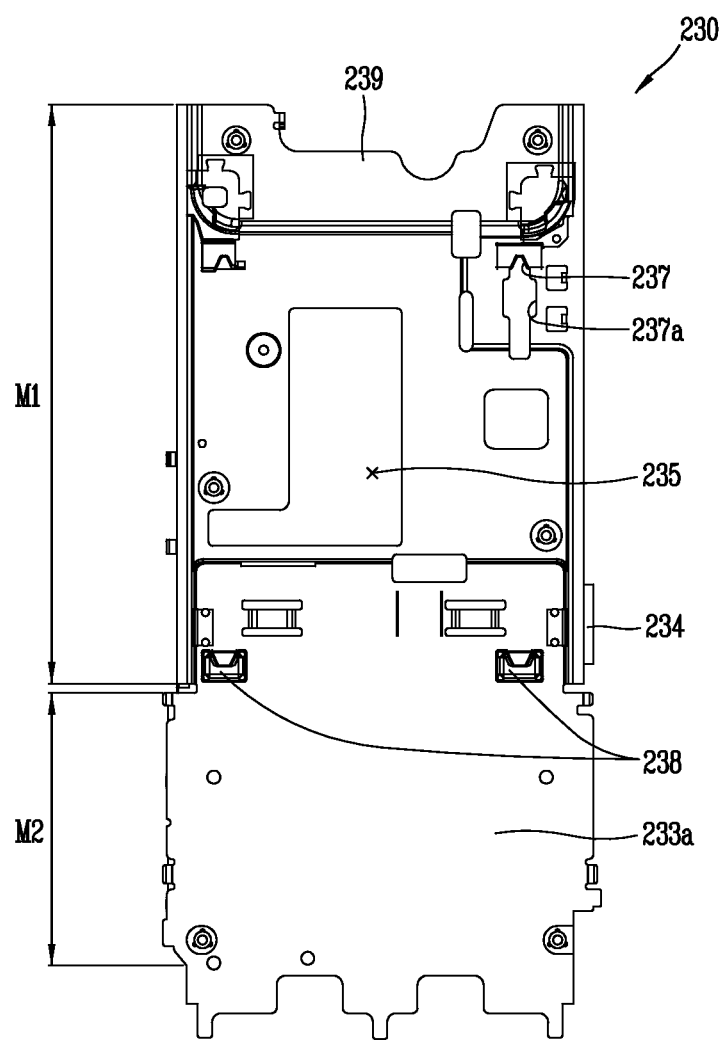
FIG. 7 is a front view of a first slide member of a mobile terminal according to the present invention.
Figure 8:
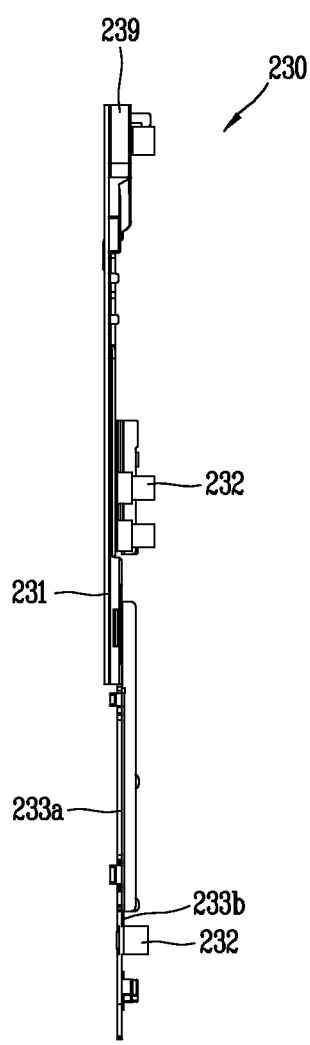
FIG. 8 is a right side view of the first slide member of FIG. 7.
Figure 9:
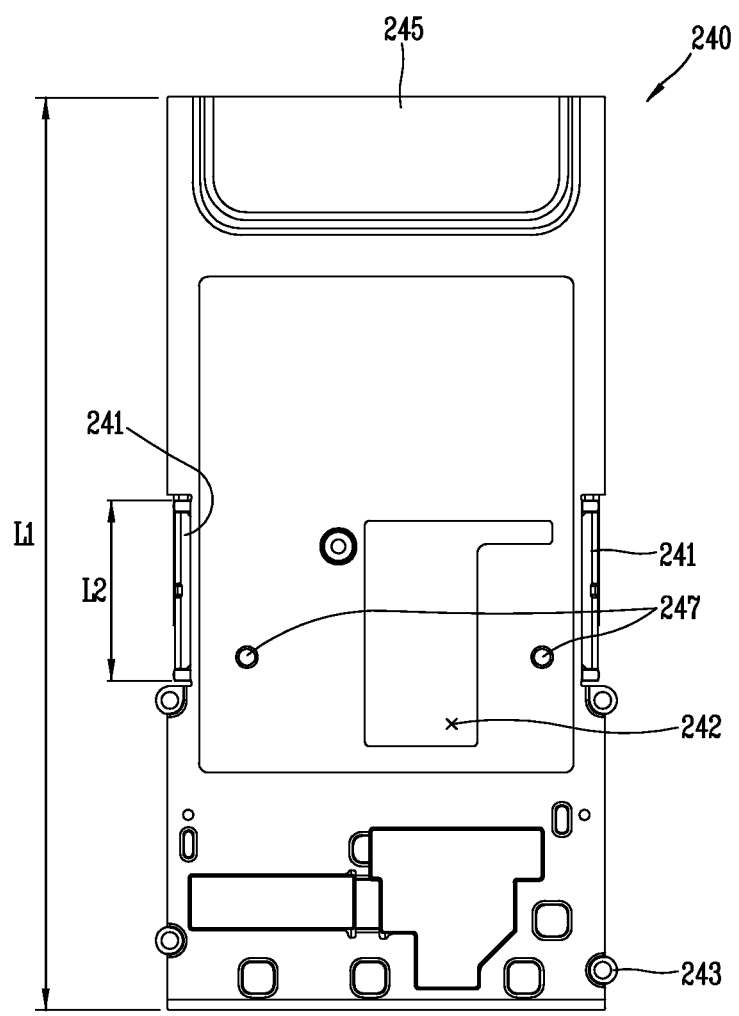
FIG. 9 is a rear view of a second slide member of a mobile terminal according to the present invention.
Figure 10:
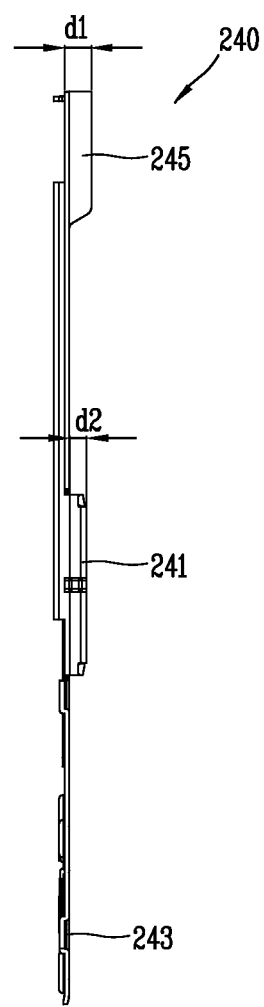
FIG. 10 is a left side view of the second slide member of FIG. 8.
Figure 11A:
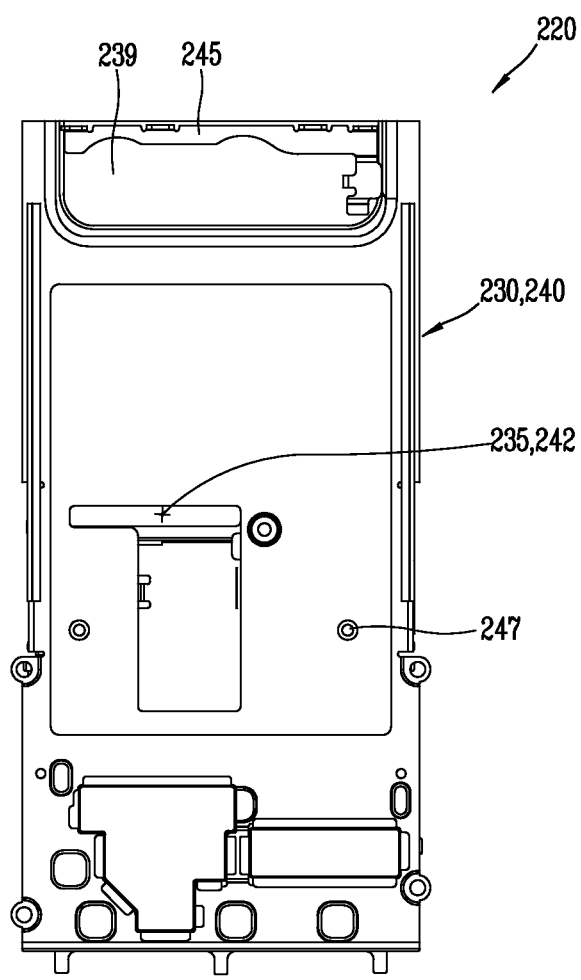
FIGS. 11A and 11B are front views showing a closed state and open state of the slide module of a mobile terminal according to the present invention.
Figure 11B:
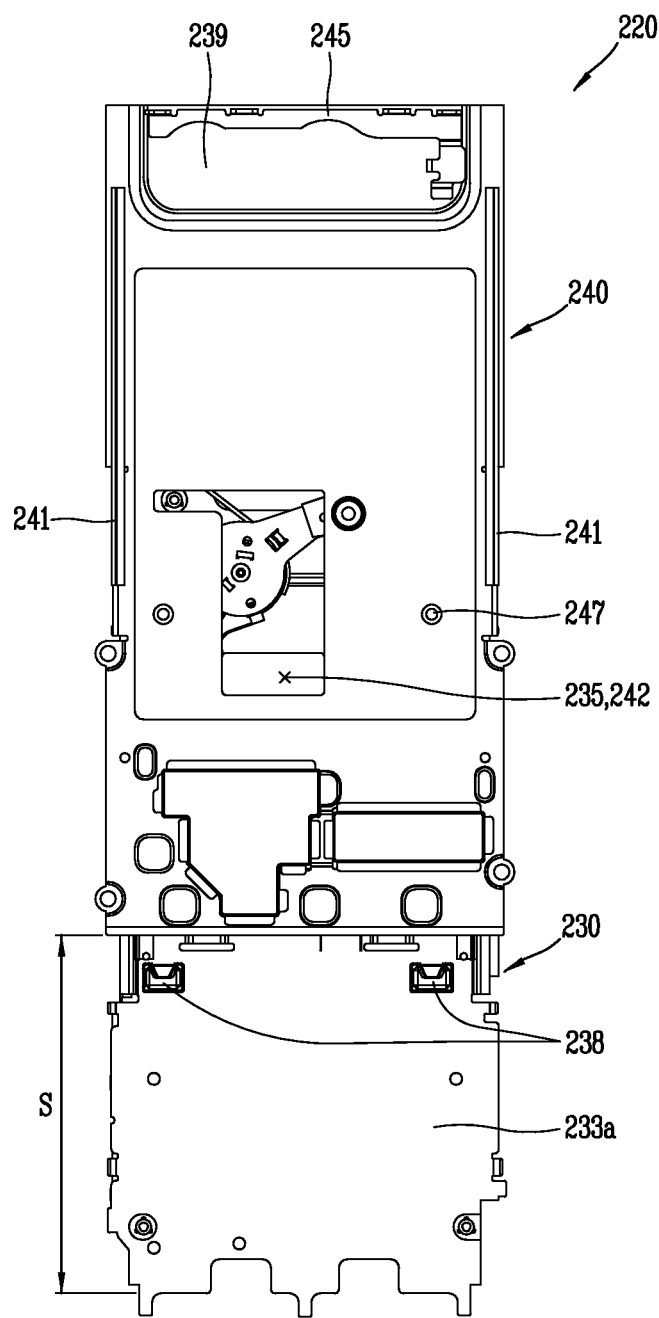

A detailed shape and structure of the first slide member 230 are illustrated in FIGS. 7 and 8, and a detailed shape and structure of the second slide member 240 are illustrated in FIGS. 9 and 10. FIGS. 11A and 11B are front views showing a closed state or configuration and open state or configuration of the slide module according to an exemplary embodiment of the present disclosure.

Figure 12:
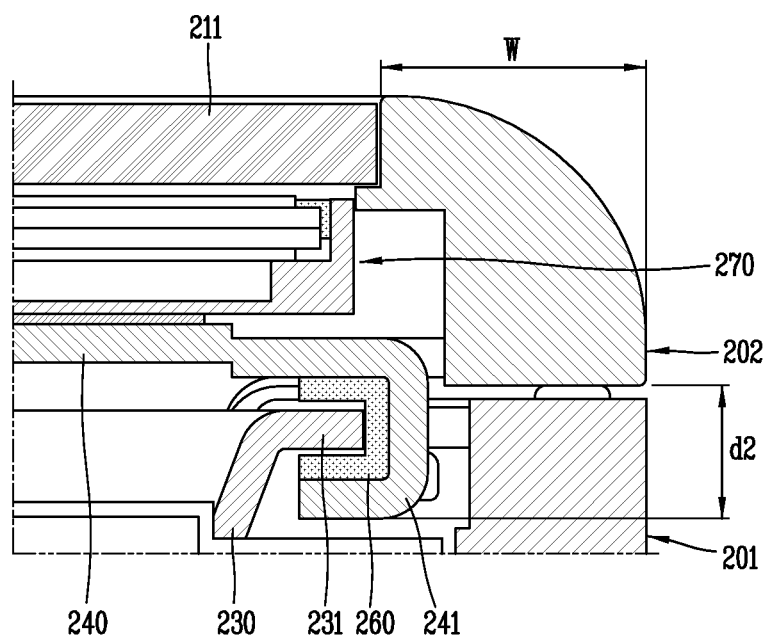
FIG. 12 is a partial cross-sectional view showing the disposition of a rail unit and a moving guide of a mobile terminal according to the present invention.

FIG. 12 is a partial sectional view showing the disposition of a rail unit 231 and a moving guide 241 of the mobile terminal 100. The rail unit 231 is formed by an edge face of the first slide member 230, and the moving guide 241 is formed to cover the rail unit 231. In more detail, the moving guide 241 is bent backward, and accordingly, the bent portion of the moving guide 241 is protruded by a certain width (d2) so as to be buried at the inner side of the front surface of the rear body 201.

A lubricant member 260 made of a soft material, such as rubber or plastic may be installed between the moving guide 241 and the rail unit 231 in order to reduce a frictional contact when the moving guide 241 is moved. Unlike the related art slide module, the moving guide 241 and the rail unit 231 are disposed such that they are not exposed when the front body 202 is open, and thereby improving the external appearance of the mobile terminal 100.

The related art problem related to the increasing thickness of a front body of a slide type mobile terminal due to the moving guide being disposed at the front body can be solved. For example, the moving guide 241 can be buried in the rear body 201.

Additionally, the peripheral space of the internal display module 270 of the front body 202 can be taken into various technical configurations to supplement rigidity, because the moving guide 241 is formed at the rear body 201 rather than at the front body 202. The front surface of the second slide member 240 can be used only for supporting the internal display module 270, because the moving guide 241 is bent to the rear side of the second slide member 240.

The rear bent structure of the moving guide 241 formed at the second slide member 240 is advantageous for an increase in size of the internal display module 270. Specifically in the related art mobile terminal having rail units mounted at a slide member of a rear body and bent forwardly, the width of the display module is inevitably limited to between the both rail units to prevent the rail units and the display module from overlapping.

However, in the present disclosure, such phenomenon does not occur. Thus, in the mobile terminal 100 of the present invention, the internal display module 270 can be increased in sized. In other words, the distance (W) between an edge face of the front body 202 and an edge face of the internal display module 270 can be minimized.

With reference to FIGS. 3 and 4, when the front body 202 is open, only a portion of the second slide member 240, excluding the rail unit 231, is exposed from the rear surface of the front body 202. The keypad 215 is also exposed when the front body 202 is open and the first slide member 230 is not exposed in the open state.

Thus, the portion of the slide module 220 exposed in the open configuration is only 'a portion' of the second slide member 240, and the portion excludes the moving guide 241 (FIG. 5). Thus, there is no need to have a complicated structural shape, thereby improving the external appearance of the mobile terminal 100.

With reference to FIG. 5, ribs 249 are attached to both sides of the front surface of the second slide member 240 for a reinforcing purpose. The ribs 249 can be attached to the front surface of the second slide member 240 independently from the moving guide 241 specifically without being affected by the disposition of the moving guide.

With reference to FIG. 5, a keypad support 233a for supporting the keypad 215 is formed at a front surface of the lower portion of the first slide member 230. The keypad 215 operates in a pressing manner and is required to be supported with a sufficient rigidity. Thus, because the support structure is simply obtained by using the first slide member 230 made of a metal form, the fabrication can be facilitated and the production cost can be reduced, compared with the case where a separate component is mounted to support the keypad 215.

With reference to FIG. 7, a keypad fixing unit 238 is formed at an upper portion of the keypad support 233a in order to temporarily fix the keypad 215 (FIG. 5) when the keypad 215 is mounted. The keypad fixing unit 238 serves to prevent the temporarily placed keypad 215 from deviating from its proper position when the rear body 201 is assembled.

As shown in FIG. 6, a lower portion of the rear surface of the first slide member 230 is a battery mounting face 233b. Unlike the keypad support 233a (FIG. 5), the battery mounting face 233b may have a larger area.

In this case, there is a possibility that the rail units 231 are exposed due to the battery mounting face 233b and, therefore, a covering member 234 is provided to the portion where an upper end portion of the battery mounting face 233b and the rail units 231 overlap in order to cover the rail units 231. The covering member 234 may be fixed to the first slide member 230 made of metal through welding.

With regard to FIG. 11B, the first slide member 230 and the second slide member 240 form a space in which a connector (not shown) is provided to electrically connect the front body 202 and the rear body 201 in the process of the opening and closing operation according to their slidable movement. A first through hole 235 is formed in the middle of the first slide member 230, and a second through hole 242 is formed in the middle of the second slide member 240 in order to provide an empty space allowing the connector to pass through while the first slide member 230 makes a slidable movement with respect to the second slide member 240.

As shown in FIG. 6, a plurality of screw fastening portions 232 are formed at edges of the first slide member 230 so as to be fixed together with the cases constituting the rear body 201. The screw fastening portions 232 may be made of metal, and may be formed integrally when the first slide member 230 is manufactured.

A screw fastening portion 243 may be also formed at the second slide member 240 for coupling with the front case 205. A fastening hook 246 may be formed at an upper end portion of the second slide member 240 in order to temporarily fix the case 205 constituting the front body 202 before the screw fastening portion 243 is fastened.

A movement preventing unit is provided in order to prevent the first slide member 230 and the second slide member 240 from relatively moving when the slidable movement of the first slide member 230 and the second slide member 240 is completed, namely, in the open configuration and in the closed configuration.

With reference to FIG. 6, a protrusion 247 having a mushroom-shaped head at its end portion is formed as the movement preventing unit. The protrusion 247 is formed on the rear surface of the second slide member 240 toward the first slide member 230.

A stopping recess 237 is provided at the second slide member 230 in order to allow the head of the protrusion 247 to be caught while the protrusion 247 is moved horizontally. The stopping recess 237 may be formed in an insert-molded form in the first slide member 230 in the metal plate form.

In order to effectively prevent movement, the protrusion 247 and the stopping recess 237 may be formed at several positions of the slide module 220. The movement preventing units proposed in the present disclosure are formed at four positions, of which two protrusions are formed at the second slide member 240, and another two protrusions are formed at the first slide member 230.

A first protrusion-shaped portion 245 is formed to be protruded by a certain width d1 (See FIG. 10) to the rear side of the front body 202 at one region of the upper end of the second slide member 240. A second protrusion-shaped portion 239 is formed at one region of the upper end of the first slide member 230 to receive the first protrusion-shaped portion 245.

The first protrusion-shaped portion 245 and the second protrusion-shaped portion 239 are advantageous for mounting a relatively large component on the front body 202. A camera unit pointing toward the front side or the rear side or an audio output module 152 or an alarm unit 153 may be mounted in the first protrusion-shaped portion 245.

With reference to FIG. 7, the rail units 231 are formed with a certain length M1 from an upper end of the first slide member 230. With reference to FIG. 9, the length L2 of the rail units 231 may be determined in relation to the length of the moving guide 241 of the second slide member 240, and the rail units 231 may extend up to the keypad 215 (FIG. 5) in consideration of the external appearance. In addition, the stroke (S) (FIG. 11B) along which the moving guide 241 is moved may be formed to be larger than the length of the keypad mounting portion 233a.

With reference to FIG. 9, the center of the moving guide 241 is positioned at the center of both sides of the front body 202. Such disposition prevents the front body 202 from receiving a force making inclination to one side with respect to the rear body 201 in the closed configuration.

The length L2 of the moving guide 241 may be 15% to 30% of the length L1 of the second slide member 240. If a long stroke is not implemented when the rail units 231 (FIG. 8) do not extend to the region of the keypad 215 (FIG. 5) and the structural stability is degraded when the stroke is increased, this range is advantageous in providing structural stability while providing a sufficient slide stroke (S) (FIG. 11B).

As so far described, the mobile terminal 100 according to the present disclosure has several advantages. Because the rail units 231 are formed on the first slide member 230 fixed to the rear body 201 and the moving guide 241 is formed on the second slide member 240 fixed to the front body 202, the moving guide 241 and the rail units 231 are not exposed when the front body 202 is open, thereby improving the external appearance of the mobile terminal 100.

Also, because the moving guide 241 is buried in the rear body 201, the related art problem related to the slide type mobile terminal, in which the moving guide is disposed on the front body and the thickness of the front body increases can be solved, and a thinner front body 202 can be implemented.

In addition, because the moving guide 241 formed at the second slide member 240 has the rear side bent structure, the internal display module 270 can be increased in size.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a front body;
a rear body; and
a slide module connecting the front body to the rear body such that the front body is slidable along a first direction with respect to the rear body between a closed position and an opened position, the slide module covered by the front body and the rear body,
wherein the slide module comprises:
a first slide member fixed to a front surface of the rear body and having a rail unit at both sides of the rear body, the rail unit having a specific length corresponding to a slide stroke of the front body; and
a second slide member fixed to a rear surface of the front body and having a moving guide constrained to the rail unit at both sides of the rear body to be slidably moved along the rail unit,
wherein the moving guide comprises a first portion and a return portion that are configured to receive the rail unit,
wherein the first portion extends along a second direction perpendicular to the first direction such that the first portion protrudes away from the front body and toward the rear body,
wherein the return portion is coupled to the first portion and arranged perpendicular to the first portion,
wherein the moving guide is covered by the front surface of the rear body in the closed position and in the opened position, and
wherein, in the opened position, the moving guide is located below an upper end of the rear body such that the moving guide is not exposed.

2. The mobile terminal of claim 1, further comprising:
a display unit and a keypad provided on a front surface of the front body.

3. The mobile terminal of claim 2, wherein the rail unit is disposed at an upper portion of the front surface of the rear body.

4. The mobile terminal of claim 2, wherein the keypad is disposed at a lower portion of the front surface of the rear body.

5. The mobile terminal of claim 3, wherein the first slide member comprises a keypad support to support the keypad.

6. The mobile terminal of claim 5, wherein the specific length of the rail unit extends a specific distance to the keypad.

7. The mobile terminal of claim 1, wherein the specific length of the rail unit is determined in relation to the moving guide.

8. The mobile terminal of claim 1, wherein a rear surface of the first slide member comprises a lower end portion that forms a battery mounting face.

9. The mobile terminal of claim 8, further comprising:
a covering member to cover the rail unit provided at a portion of the first slide member such that an upper end portion of the battery mounting face and the rail unit overlap.

10. The mobile terminal of claim 1, wherein the rail unit is formed by an edge face of the first slide member.

11. The mobile terminal of claim 10, wherein the moving guide is formed to cover the rail unit.

12. The mobile terminal of claim 1, wherein the moving guide is centrally located with respect to both sides of the front body.

13. The mobile terminal of claim 1, wherein a specific length of the moving guide is 15~30% of a specific length of the second slide member.

14. The mobile terminal of claim 1, wherein the first and second slide members are formed of a metallic plate material.

15. The mobile terminal of claim 1, further comprising:
a first protrusion-shaped portion formed at an upper end of the second slide member such that the first protrusion-shaped portion is protruded to the rear surface of the front body; and
a second protrusion-shaped portion formed at an upper end of the first slide member such that the second protrusion-shaped portion receives the first protrusion-shaped portion when the first and second slide members overlap entirely.

16. A mobile terminal comprising:
a front body;
a rear body;
a display module provided in the front body; and
a slide module connecting the front body to the rear body such that the front body is slidable along a first direction with respect to the rear body between a closed position and an opened position, the slide module covered by the front body and the rear body,
wherein the slide module comprises:
a first slide member fixed to a front surface of the rear body and having a rail unit at both sides of the rear body, the rail unit having a specific length corresponding to a slide stroke of the front body; and
a second slide member fixed to a rear surface of the front body and having a moving guide constrained to the rail unit at both sides of the rear body and displaced by a sliding motion along the rail unit,
wherein the moving guide comprises a first portion and a return portion that are configured to receive the rail unit,
wherein the first portion extends along a second direction perpendicular to the first direction such that the first portion protrudes away from the front body and toward the rear body,
wherein the return portion is coupled to the first portion and arranged perpendicular to the first portion,
wherein the moving guide is covered by the front surface of the rear body in the closed position and in the opened position, and
wherein, in the opened position, the moving guide is located below an upper end of the rear body such that the moving guide is not exposed.

17. The mobile terminal of claim 16, further comprising:
a lubricant member provided between the moving guide and the rail unit to reduce friction when the moving guide slides along the rail unit.

18. The mobile terminal of claim 16, wherein the rail unit is positioned at a portion of the first slide member that remains covered when the first and second sliding members partially overlap such that the moving guide remains covered when the moving guide slides along the rail unit.

19. The mobile terminal of claim 16, wherein the second slide member is displaced relative to the first sliding member according to a difference between the specific length of the rail unit and a specific length of the moving guide.

20. The mobile terminal of claim 16, wherein the moving guide slides along the rail unit according to a pre-set slide stroke applied at a lower portion of a front surface of the front body.

21. The mobile terminal of claim 16, wherein the rail unit comprises an edge face extending from the front surface of the rear body to be received by the moving guide.

* * * * *